May 20, 1958  E. H. BICKLEY  2,835,373
ARTICLE ALIGNING CONVEYOR FOR COLOR SORTING MACHINE
Filed May 10, 1954   2 Sheets-Sheet 1
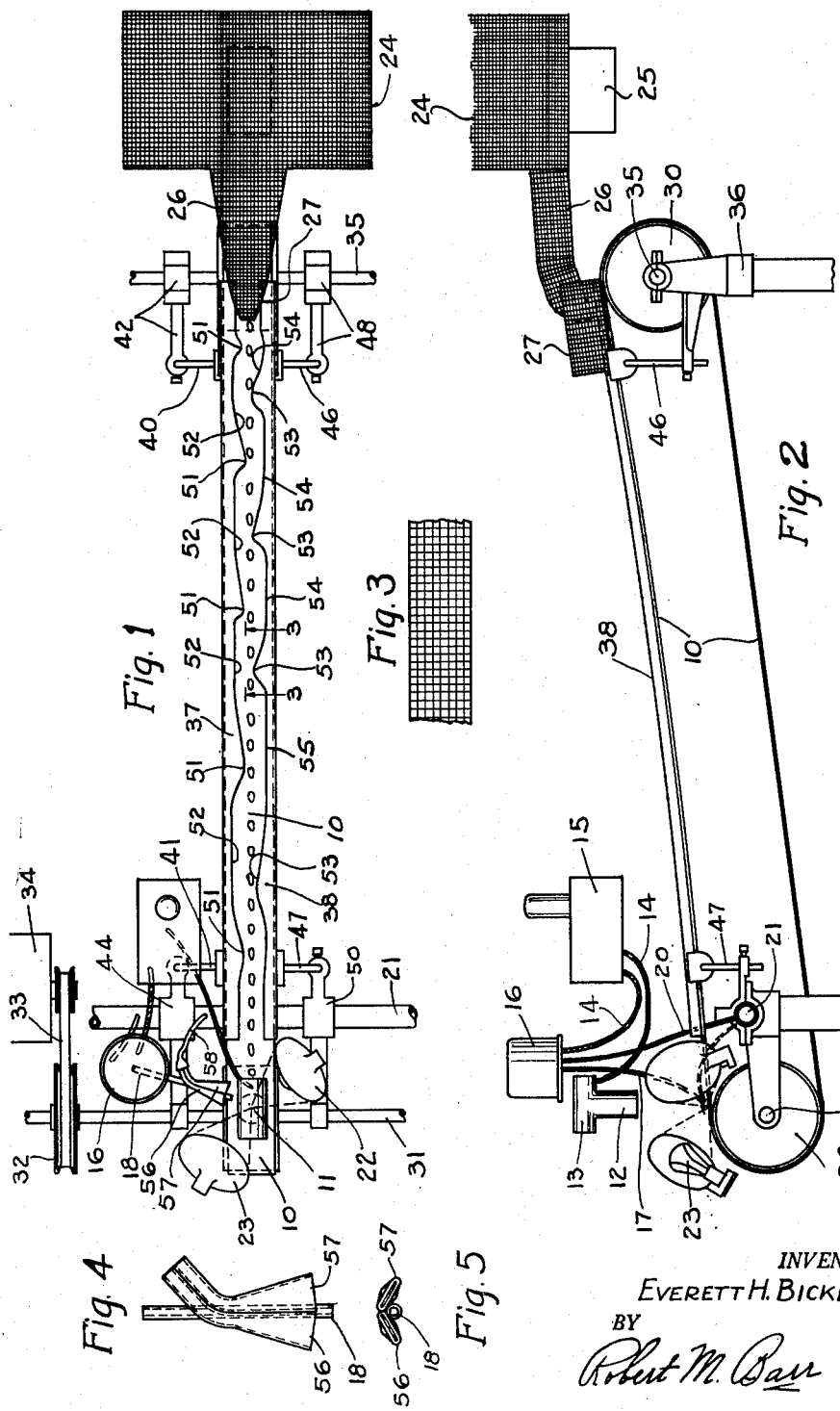
INVENTOR.
EVERETT H. BICKLEY
BY
Robert M. Barr May 20, 1958  E. H. BICKLEY  2,835,373
ARTICLE ALIGNING CONVEYOR FOR COLOR SORTING MACHINE
Filed May 10, 1954  2 Sheets-Sheet 2
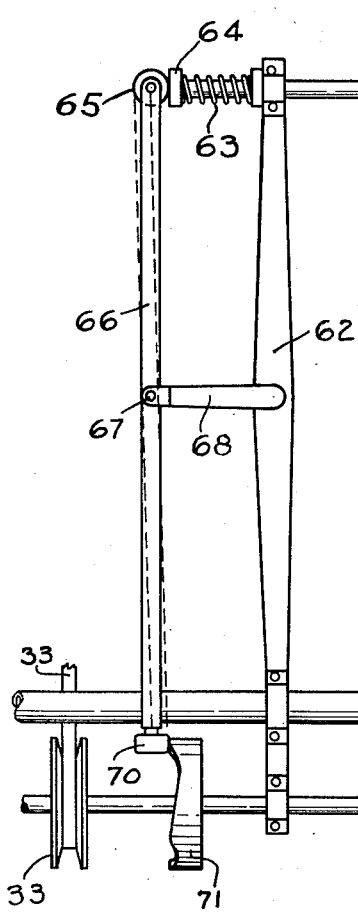
Fig. 6
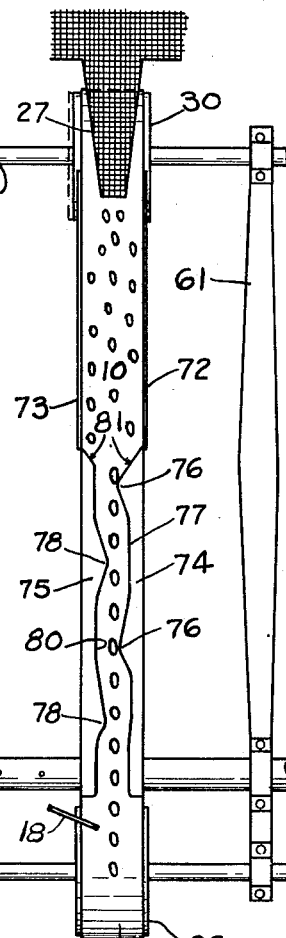
Fig. 8
Fig. 7
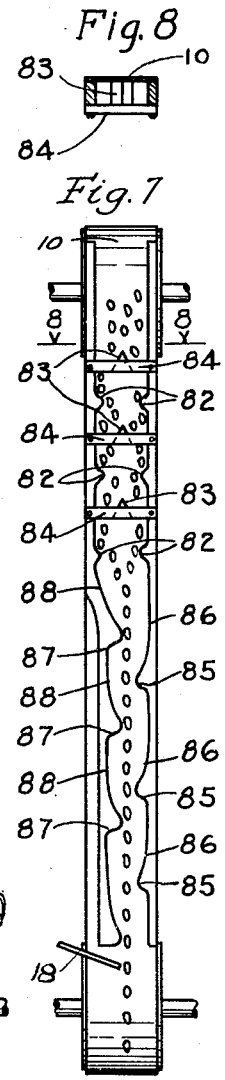
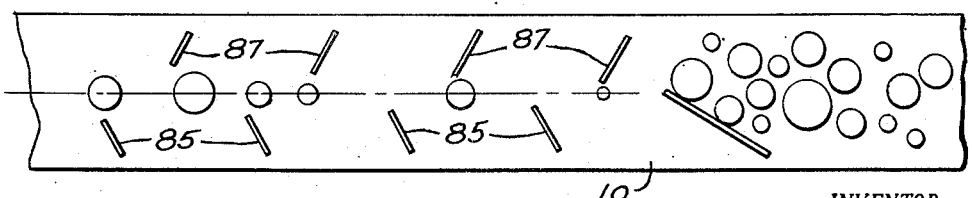
Fig. 9
INVENTOR.
EVERETT H. BICKLEY
BY
Robert M. Barr

United States Patent Office 2,835,373
Patented May 20, 1958

2,835,373
ARTICLE ALIGNING CONVEYOR FOR COLOR SORTING MACHINE

Everett H. Bickley, Narberth, Pa.

Application May 10, 1954, Serial No. 428,748

3 Claims. (Cl. 198—29)

The present invention relates to machines for sorting objects according to color, an example of such type being shown in applicant's Patent No. 2,580,275, upon which this invention is a modification and/or an improvement. More particularly the present invention relates to scanning and the feeding and positioning of sticky objects as well as dry objects of split form such as wet lima beans and coffee beans to an inspection point for color sorting.

In the operation of prior sorting devices when applied to fresh green wet lima beans it has been found exceedingly difficult to maintain the high quality of sorting required by the industry because such beans stick together or to the feeding conveyor hopper and guides and so not only fail to obtain and maintain a single file relation but also tend to pass the inspection point in such various surface exposed positions as will prevent accurate color sorting. Also it has been found difficult to position and scan coffee beans for high accuracy sorting because of the convex and irregular plane surfaces which react to hinder any certain positioning and scanning of the same inspection area of a succession of beans at the inspection point to get a true signal.

It is an object of the present invention to eliminate the foregoing disadvantages and maintain a high rate of sorting with precise and accurate results.

Another object of the invention is to provide a device for feeding and selectively inverting beans in single file to an inspection point arranged with a selected area exposed for scanning.

Another object is to provide a feeding means for green or wet lima beans wherein such beans are manipulated to separate beans stuck together and bring all beans in single file past an inspection point with the same area of each exposed for inspection.

Another object is to provide a device at the inspection point of a sorting machine, wherein dust, droplets or particles detached from the objects being sorted is discharged away from and so prevent fogging the light source, reflector and optical parts.

Another object is to provide a device for feeding objects shaped like coffee beans to an inspection point to reach such point with the convex side of each bean turned towards the viewing or scanning means.

A further object is to provide a bean feeding device wherein beans of varying sizes are manipulated to pass an inspection point in accurately centered relation.

A still further object is to provide two opposed sources of light focussed at a common inspection point to compensate for slight bean positioning irregularities.

These and other objects of the invention and the numerous features and details of the construction and assembly of elements thereof, are hereinafter fully set forth and described with reference to the accompanying drawings, in which:

Fig. 1 is a plan view of one unit of a color sorting machine for beans or other objects showing the positioner feeder and scanning mechanism embodying one form of the present invention;

Fig. 2 is a side elevation of the same;

Fig. 3 is an enlarged detail on line 3—3 of Fig. 1 showing the roughened object contact face as applied to both guide rails;

Fig. 4 is a detail plan view of the novel air discharge nozzles;

Fig. 5 is an end elevation of the nozzle of Fig. 4;

Fig. 6 is a plan view of a modified form of the invention;

Fig. 7 is a plan view of a coffee bean inverting and positioning guide structure embodying a modification of the invention;

Fig. 8 is an inverted end elevation view of the conveyor assembly, and Fig. 9 is a fragmental enlarged diagrammatic plan view of the conveyor showing articles in transit.

Referring to Figs. 1 and 2 of the drawings, a scanning mechanism is shown wherein a conveyor 10 delivers beans to an inspection point 11 below and alined with a tube 12 including a photo-electric cell 13 as a part of a sorting electric circuit 14 including an amplifier unit 15. This unit 15 controls a magnetic puffer valve 16 for delivering bean ejecting puffs of air by way of pipe 17 to a discharge nozzle 18 at the inspection point 11. Air under pressure is supplied by pipe 20 from a main supply pipe 21 to the puffer valve 16. Details of this assembly can be found by reference to applicant's Patent No. 2,580,275. The inspection point 11 is defined by focussed rays of light, in this instance, by two sources of light 22 and 23, including lamps and reflectors respectively as will be understood. While heretofore light from one direction has been satisfactory (as will be seen from the aforesaid patent) for successful inspection for certain objects such as dry rice and dry flat beans, a multiple light source has been found to give the accurate sorting required for wet sticky lima beans. This presented a difficult and elusive problem which the present invention finally solved by adding a second opposed light source in association with a novel bean positioning and feeding means. As shown the two sources of light 22 and 23 are disposed to focus the respective light rays from opposite sides so that irrespective of slight irregularities in the bean presentation the object will be illuminated properly for the required sensitive inspection for high speed sorting with accuracy.

While the apparatus of the present invention is broadly for sorting any kind of objects, beans, nut kernels or the like, its application here described is for the sorting of lima beans in a wet or sticky condition which presented a feeding and positioning problem not present in the handling of dry beans. As a step in solving this problem a hopper 24 of roughened surface, such as wire mesh, to avoid the suction of flat surfaces, is provided and attached to a unit 25 imparting a vibratory movement by any well known means not shown. The hopper 25 discharges by way of a wire mesh chute 26 into a wire mesh funnel 27 positioned to deliver the beans medially of the conveyor 10 to travel therewith to the inspection point 11. In the present instance, the conveyor 10 is in the form of a belt which may have a rough surface, preferably of rubber, or other material, driven by a pulley 28 and passing in stretched condition around a second pulley 30. The pulley 28 is keyed to a shaft 31 suitably journalled and driven by a pulley 32 and belt 33, from a source of power such as a motor 34. The pulley 30 is keyed to a shaft 35 which is journalled in end standards 36, one only being shown because the shaft 35 extends lengthwise of a sorting machine to mount a plurality of such pulleys for the respective sorting units. Preferably the pulley 30 is arranged at a higher level than the pulley 28 in order to provide an incline to assist the forward movement of the object, the angle or pitch predetermined to maintain a uniform object feeding.

In order to accurately bring the beans in single file to pass the inspection point 11 on the conveyor 10, two positioning vertically disposed guide rails 37 and 38 are provided at opposite sides respectively of and overlying the conveyor 10 to define a through passage leading from the outlet of the funnel 27 to a delivery location in close proximity to the inspection point 11. The rail 37 is carried by two longitudinally spaced arms 40 and 41, the former being attached to a bracket 42 lengthwise adjustable upon the shaft 35, and the latter being attached to a bracket 44 lengthwise adjustable upon the pipe 21. The two brackets 42 and 44 are arranged to be fixed in a selected position by set screws or the like. The rail 38 is carried by two longitudinally spaced arms 46 and 47, the former being attached to a bracket 48 lengthwise adjustable upon the shaft 35, and the latter being attached to a bracket 50 lengthwise adjustable upon the pipe 21. Thus the two rails 37 and 38 are disposed just above the upper face of the conveyor 10 in juxtaposed relation and are bent down intermediate of the supports to conform more or less to the sag in the conveyor 10 to form a passage of predetermined width capable of width adjustment according to the material being sorted. Also it should be noted that the juxtaposed faces of the respective rails 37 and 38 are respectively roughened, for example as shown in Fig. 3, to prevent sticky articles such as wet lima beans from sticking to the rail faces to pile up one behind another and so obstruct the free flow of the objects.

Since wet lima beans or any other sticky objects always adhere one to another when bulked in a hopper or otherwise, the present invention provides a novel means for breaking apart adhering beans or beans riding piggy-back, comprising a plurality of abutments 51 projecting laterally from the inner edge of the rail 37 and interconnected in pairs by cam faces 52. Likewise the rail 38 is formed with a plurality of abutments 53 interconnected in pairs respectively by two cam faces 54 and a cam face 55 relatively longer than either of the faces 54. Also it will be noticed that the abutments on one rail are juxtaposed to the cam faces on the other rail and consequently any projection on one rail is straddled in lengthwise spaced relation by a pair of projections on the other rail. Furthermore each abutment of each row of abutments terminates in spaced relation to the center plane of the conveyor. Preferably this spacing sequentially increases towards the delivery end of the conveyor to thereby bring the separated beans of various sizes into true single file alinement with the inspection point.

In operation the beans discharge from the hopper 24, which in vibrating keeps the beans moving into and through the funnel 27 to enter the guide passage formed by the spaced rails 37 and 38. The beans so delivered in wet condition are stuck one to another in piggy-back or clogging relation and are carried along by the moving conveyor 10, and beginning with the first abutment 51 on rail 37 are deflected diagonally across the passage to strike the cam face leading to the first abutment 53 of rail 38 to be again deflected across the passage to ride along the cam face 52 and be thrown by the second abutment 51 across to cam face 54, and so continuing in a zigzag path until past the fourth abutment 51 when all the beans have been individually separated and by the final graded cam faces are directed in perfect, single file alinement. While the abutment arrangement indirectly forms a zigzag path the actual movement of the bean to single file relation is one laterally of the conveyor and gauged by the spacing of each abutment with respect to the median line of the conveyor. This spacing progressively increases from the receiving end to the discharge end of the conveyor. In other words, a line drawn tangent to the abutments at one side of the conveyor diverges from a like line tangent to the other set of abutments so that the larger beans have room to be shifted laterally so that each has its center coincident with the medial line of the conveyor. This progressive increase of lateral space for bean positioning compensates for the different size of beans and insures all beans being alined medially of the conveyor. Thus a small bean entering the conveyor will strike the first abutment and be shifted to bring its center coincident with the median line of the conveyor after which it can travel to the discharge end without necessarily striking another abutment. The larger beans on the other hand require more lateral clearance and must hit abutments in succession until finally brought into the single file. A maximum sized bean may have to travel to the last abutment before being positioned. At the inspection point all the beans pass in single file, each with its most effective scanning spot coincident with the medial line of the conveyor.

At the inspection point the scanning head and its associated parts automatically sort the beans according to color, with lighter colored beans discharging into one container and darker colored beans into another. When the photo-cell responds to a light colored bean the puffer valve unit 16 operates to project a puff of air from the nozzle 18 and propel the said bean into its container. In the case of wet articles such as lima beans it was found that sorting accuracy was greatly impaired by droplets, wax, and particles at the inspection point producing a fog upon the optical parts. As a means to overcome this difficulty an auxiliary air discharge means is provided including in the present instance, two jets 56 and 57, attached to the nozzle 18 to communicate by a common pipe 58 with the compressed air supply pipe 21. Thus during operation of the machine two constant jets of air discharge transversely across the area above a bean at the inspection point and effectively prevent fogging conditions.

Referring to Fig. 6 of the drawings a modified form of bean feed is shown, wherein the pulley 30 for the conveyor 10 at the receiving end is fixed to a reciprocable rod 60 slidable endwise in bearings respectively in the frame members 61 and 62. These members also support the air supply pipe 21 and the shaft 31 which carries the pulley 28. One end of the rod 60 projects beyond the frame member 62 and is biased to the left as seen in Fig. 6 by a spring 63 compressed between the member 62 and a head 64 on the end of the rod 60. To shift the rod 60, by overcoming the pressure of the spring 63, a roller 65 is provided to bear against the head 64, such roller being on one end of a lever 66 pivoted at 67 to an arm 68 fixed to the member 62. The opposite end of the lever 66 terminates in a wiper roller 70 biased against a side face cam 71, which is keyed to the rotatable shaft 31. By this construction the rod 60 is caused to reciprocate at a selected speed and thus cause the desired transverse vibration of the conveyor required to agitate beans and more particularly turn coffee beans to rest on their flat sides. In this way the convex surface of each bean reaches the inspection point in viewing position by the photo-cell.

In this form of the invention the receiving end portion of the conveyor 10 is bounded by two side rails 72 and 73 affording an unobstructed passage for coffee beans to be vibrated into viewing position. For the remaining portion of the conveyor a tortuous passage is provided by two rails 74 and 75 overlying the respective margins of the conveyor 10 to form two juxtaposed surfaces formed by abutments and cam guide faces. Thus the rail 74 has two abutments 76 straddling a guide face 77 and the rail 75, two abutments 78 straddling a guide face 80. The abutments on one rail are staggered with respect to those on the other, while all the abutments terminate in spaced relation to the center line of the conveyor. The entrance end of the tortuous, positioning passage has an inwardly converging mouth 81, and where coffee beans are being fed, the beans as positioned by vibration ride smoothly through the mouth to form a single file alined with the center line of the conveyor. On the other hand lima beans being fed may reach the passage still in a stuck together condition and so the projecting abutments provide the required obstructions for separating such beans and arranging them in single file relation.

Referring to Figs. 7 and 8, a modified form of the invention is shown more particularly for feeding and positioning coffee beans so that each bean reaches the inspection point with its convex side uppermost. To that end the respective rails bounding the sides of the conveyor 10 are provided with inwardly disposed abutments 82, arranged in juxtaposed spaced relation, and in the present instance three such abutments 82 are shown as giving satisfactory results. These abutments 82 are effective to turn coffee beans over to rest upon the flat sides. To guide the beans being fed by the conveyor 10 into alinement with the respective sets of abutments, one or more V-shaped separators 83 depend respectively from bridge members 84 attached to the side rails. Each separator 83 terminates in such close proximity to the conveyor 10 as will divert the advancing group of beans into two streams so that one stream strikes the abutments on one rail and the other stream strikes the abutments on the other rail. The separators 83 preferably coincide with the medial vertical plane of the conveyor 10. Where, as here, more than one separator is used, those beyond the initial one, which is close to the receiving end of the conveyor, are located between the pairs of abutments 82. By the time the fed beans pass the last pair of abutments 82, at approximately a third of the length of the conveyor, all have been positioned as required, and are smoothly guided into single file by lengthwise spaced rounded abutments 85 projecting from one side rail. The face of this rail between its abutments, is formed with a relatively slightly concave guide face 86, each of which determines the proper spacing for the abutments 85. Likewise the opposite side rail for the conveyor is provided with a spaced rounded abutment 87 projecting into close proximity to the center line of the conveyor. Between each pair of abutments 87 the face of the rail is shaped to form an elongated slightly concave guide face 88.

From the foregoing it will be seen that the beans are fed forward against the separators and divide into two streams to enter a generally straight passage bounded by a succession of abutments 82 against which the beans strike to be turned over on their flat sides. While one pair of abutments 82 can operate effectively for the required positioning purpose, it is preferred to use two or three pairs to catch any stragglers which the other pair or pairs have missed.

It will now be apparent that a novel bean feeding mechanism for sorting machines has been devised wherein moist or sticky beans can be successfully arranged in single file and delivered rapidly in succession to an inspection point. While certain embodiments of the invention have been illustrated and described herein, it is not intended to limit the invention to such disclosures, and changes and modification may be made therein and thereto within the scope of the following claims.

Having now described my invention, I claim:

1. An object sorting unit of the type having a photoelectric mechanism for scanning objects at an inspection point, comprising a conveyor for feeding objects from a receiving point to the inspection point, means for driving said conveyor, guide members forming two sets of abutments projecting over said conveyor at opposite sides respectively and terminating in laterally spaced relation to the median line of said conveyor, said guide members being so spaced as to form a zigzag channel of a width at all points so substantially greater than the maximum size of any object being sorted as to permit free lateral movement thereof for positioning all objects medially of said conveyor, the spacing of the abutments of the set at one side of said conveyor from said medial line progressively increasing from the receiving end of said conveyor, whereby the abutment spacing medially of the conveyor increases to compensate for varying object sizes while guided into a single medial file.

2. An object sorting unit according to claim 1, wherein the spacing of the other set of abutments from the medial line also increases from the receiving end of the conveyor.

3. An object sorting unit according to claim 2, wherein the two sets of abutments are staggered lengthwise of the conveyor.

References Cited in the file of this patent

UNITED STATES PATENTS

| 266,448 | Fahringer et al. | Oct. 24, 1882 |
| 1,224,484 | Mero | May 1, 1917 |
| 1,381,204 | Lawry | June 14, 1921 |
| 1,921,863 | Bickley | Aug. 8, 1933 |
| 1,959,238 | Horsfield | May 15, 1934 |
| 2,646,870 | Parry | July 28, 1953 |
| 2,696,297 | Matthews | Dec. 7, 1954 |

FOREIGN PATENTS

| 667,669 | Great Britain | Mar. 5, 1952 |